United States Patent [19]
Partow et al.

[11] Patent Number: 5,828,011
[45] Date of Patent: Oct. 27, 1998

[54] HIGH VOLTAGE STYLUS FOR PORTABLE COMPUTER

[75] Inventors: Tony S. Partow; Carl M. Stanchak, both of Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 191,908

[22] Filed: Feb. 4, 1994

[51] Int. Cl.⁶ .................................................. G08C 21/00
[52] U.S. Cl. ............................................................. 178/18
[58] Field of Search ........................ 178/18, 19; 336/182, 336/183; 323/359; 363/131

[56] References Cited

U.S. PATENT DOCUMENTS

| | | | |
|---|---|---|---|
| 4,862,152 | 8/1989 | Milner | 178/18 |
| 5,054,005 | 10/1991 | Schorum | 178/18 |
| 5,138,118 | 8/1992 | Russell | 178/19 |
| 5,218,174 | 6/1993 | Gray et al. | 178/19 |
| 5,225,637 | 7/1993 | Rodgers et al. | 178/19 |

*Primary Examiner*—Stephen Chin
*Assistant Examiner*—Kevin Kim
*Attorney, Agent, or Firm*—Wayne P. Bailey

[57] ABSTRACT

The invention concerns a stylus for producing a high-voltage, sinusoidal signal for an electrostatic digitizing pad. The high voltage is obtained by applying a sine wave to one lead of the primary of a transformer, and applying the inverse of the sine wave to the other lead of the primary. The secondary of the transformer produces the high voltage, which is developed into a signal which is applied to the digitizing pad.

10 Claims, 11 Drawing Sheets

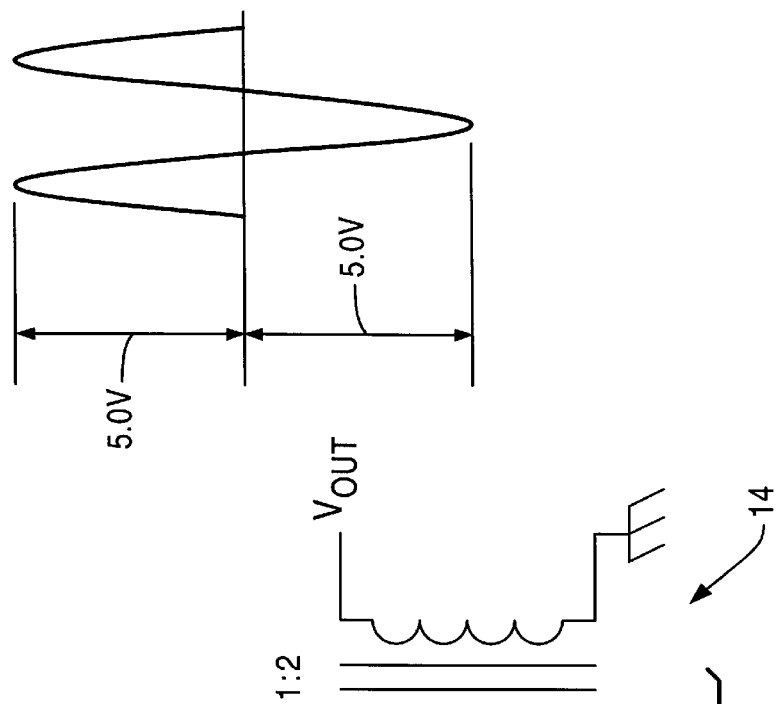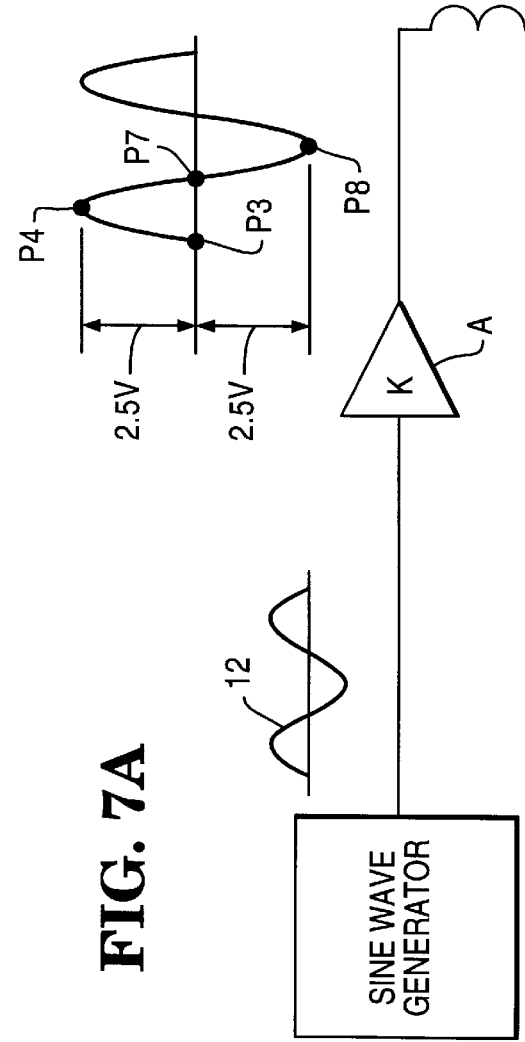

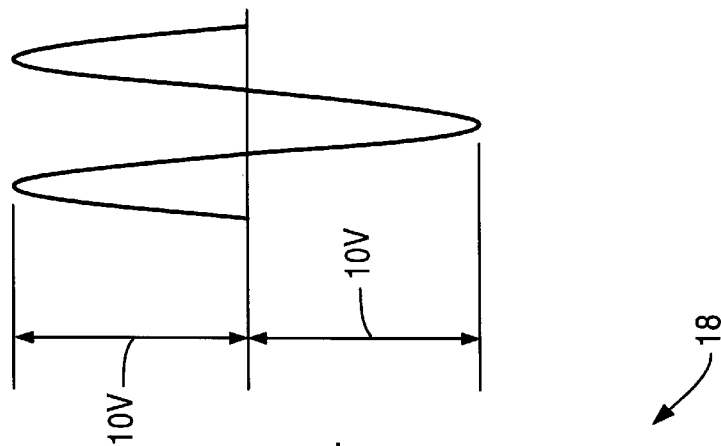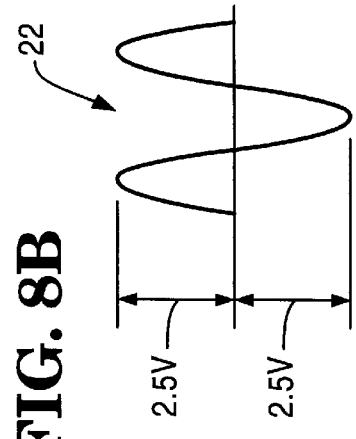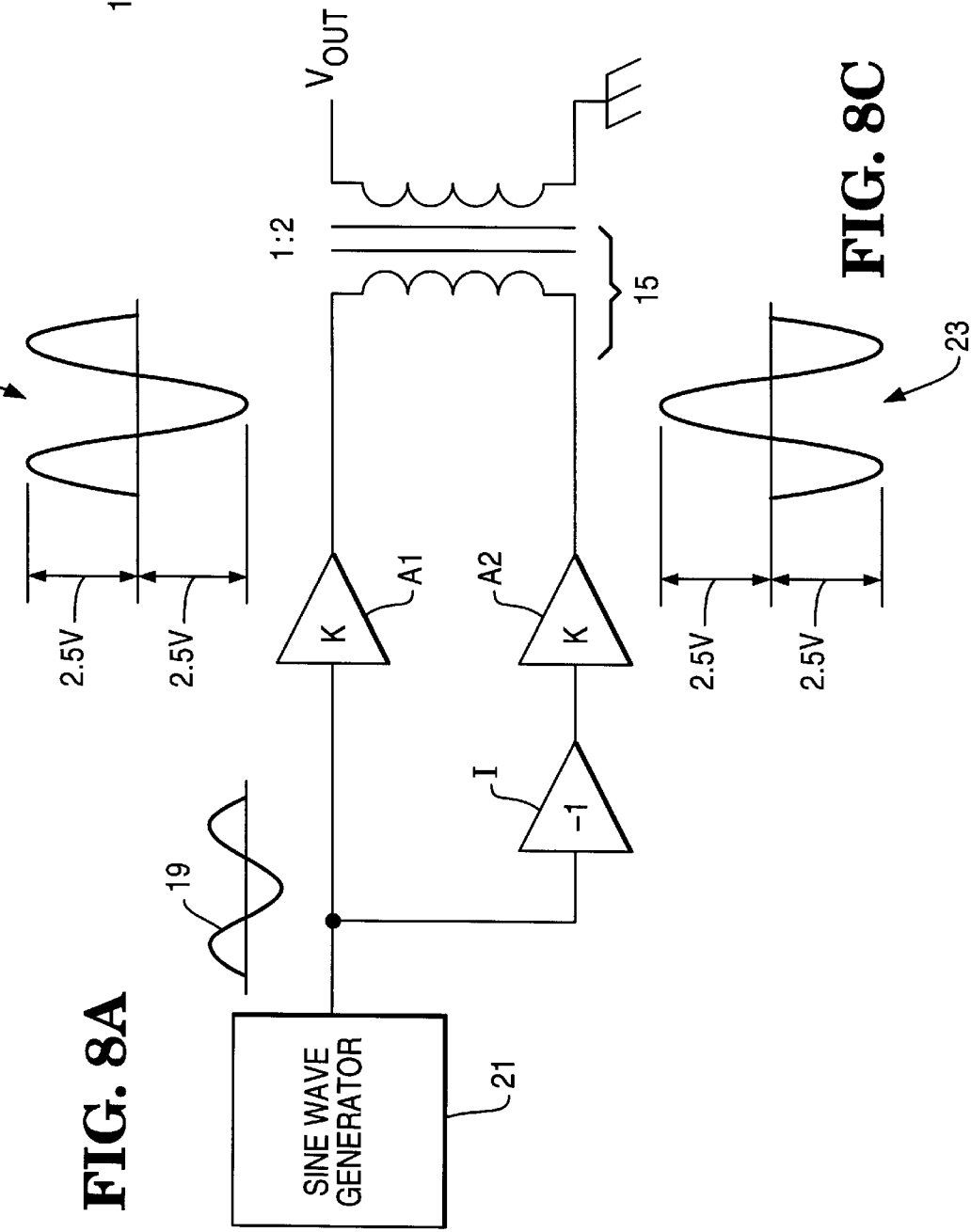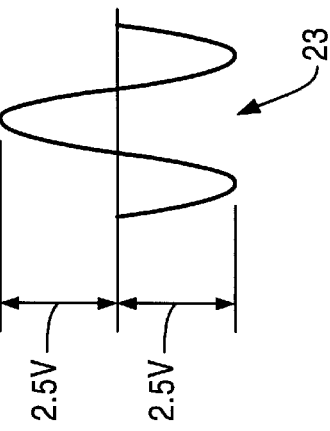

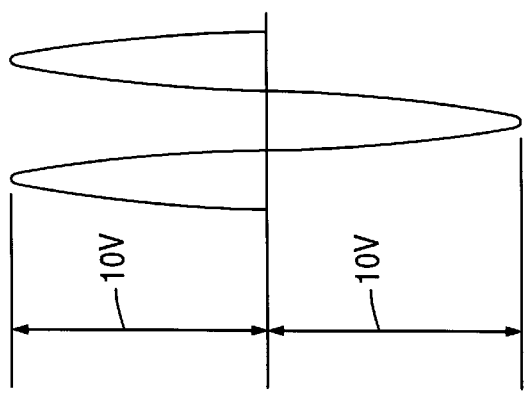
FIG. 10B
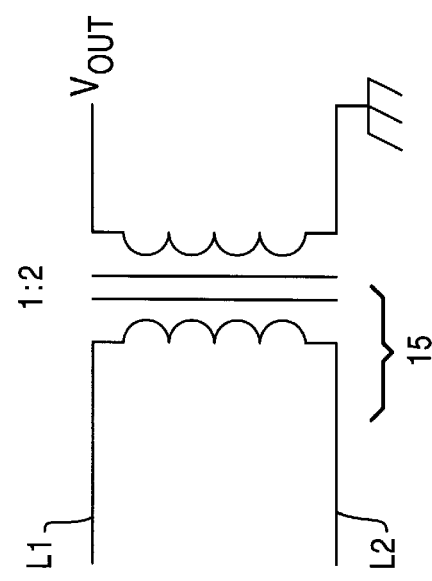
FIG. 10A
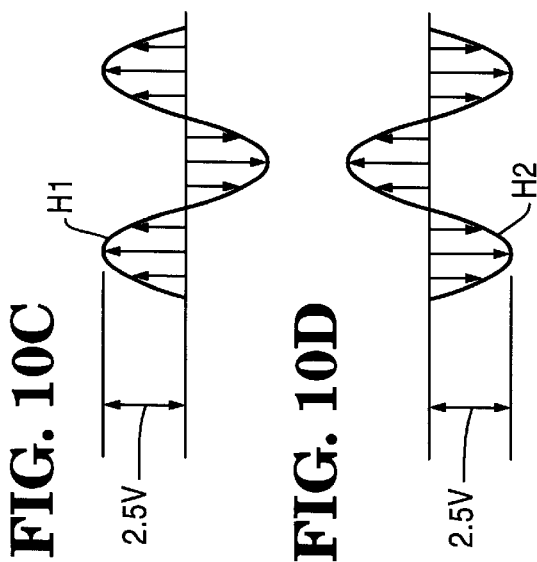
FIG. 10C
FIG. 10D
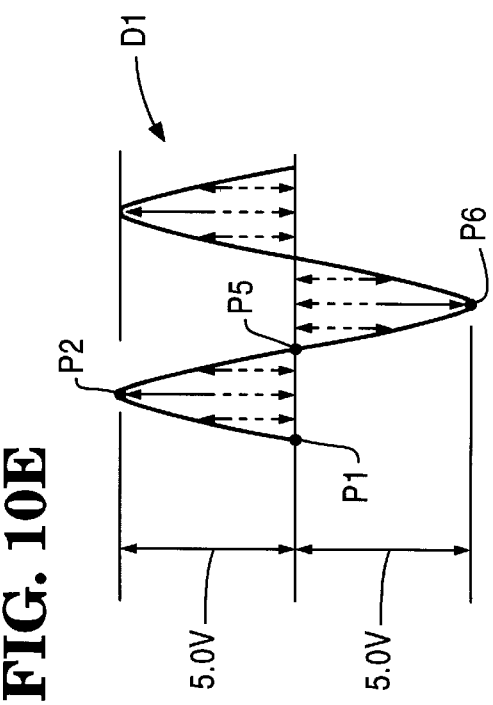
FIG. 10E

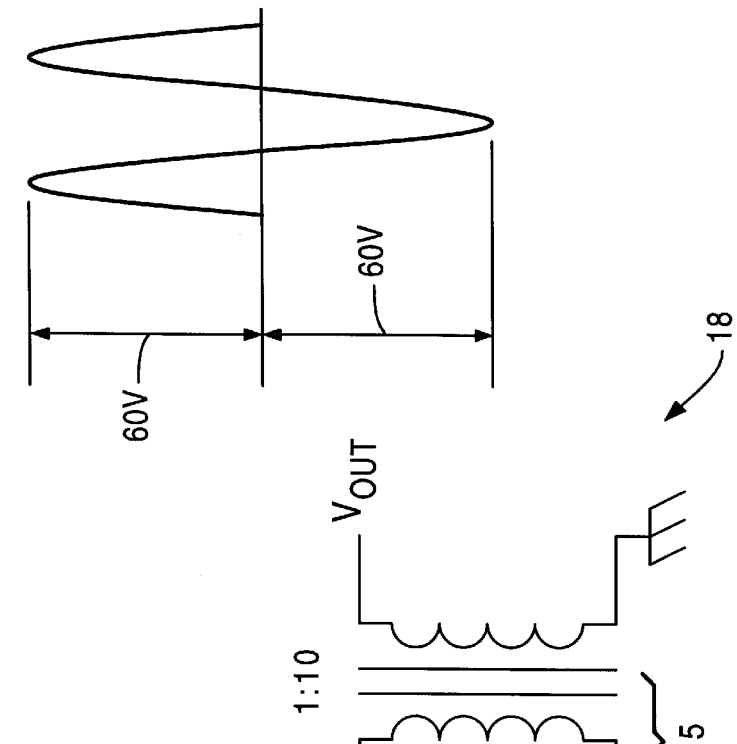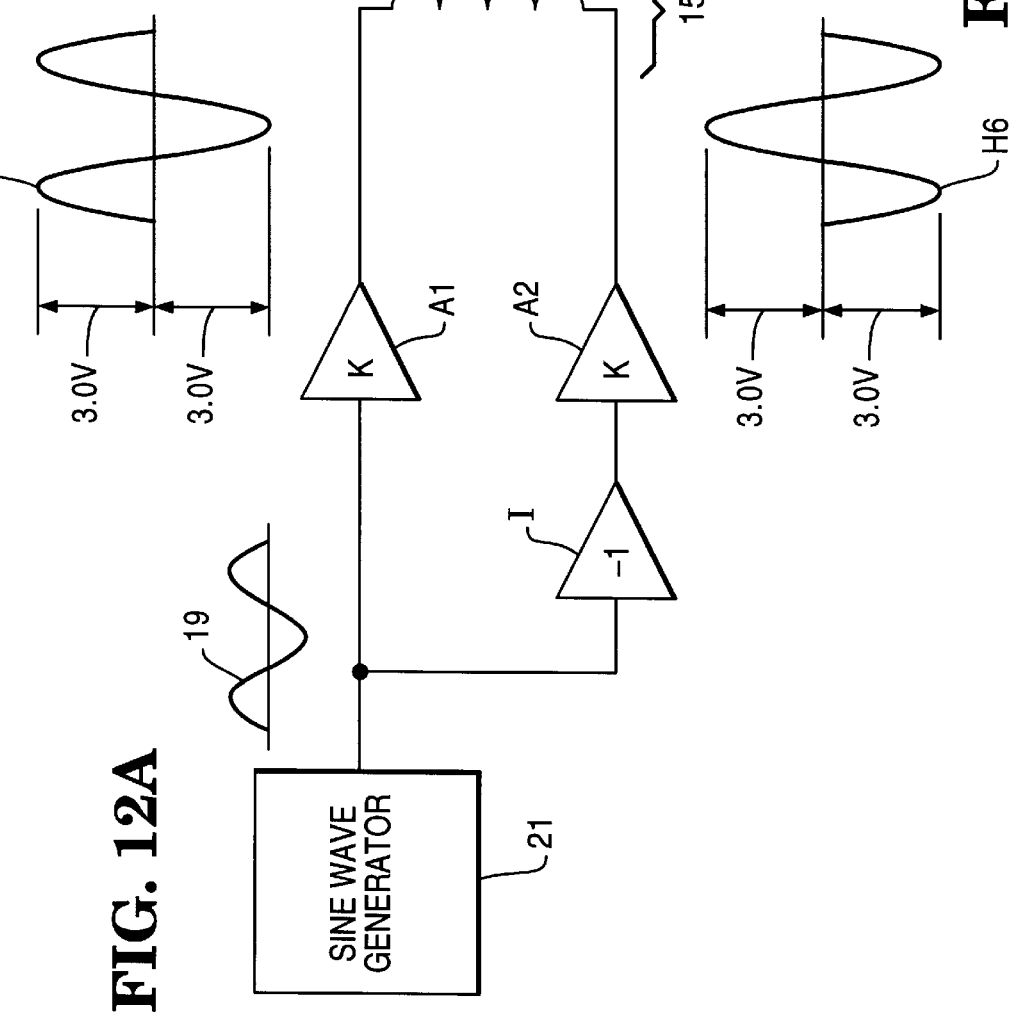

HIGH VOLTAGE STYLUS FOR PORTABLE COMPUTER

The invention concerns a stylus for use with a digitizing pad. Such pads can take the form of a transparent overlay atop the display of a portable computer.

BACKGROUND OF THE INVENTION

FIG. 1 is a highly simplified view of a digitizing pad 3 and its associated stylus 6. There are four current-to-voltage amplifiers (labeled I-to-V), one at each corner. The stylus 6, when activated, produces a signal 9, as indicated in FIG. 2. This signal induces currents I1–I4, which are detected by the I-to_V amplifiers.

The I-to-V amplifiers each produce a voltage indicative of the size its respective current. Processing circuitry, known in the art, receives the voltage signals, and computes the position of the stylus signal 6, based on the voltage signals.

The currents I1–I4 are induced because the stylus 6 acts as one plate of a capacitor. The digitizing pad (which bears a resistive surface of a material such as indium tin oxide) acts as the other plate. As FIG. 3 indicates, when negative charge is applied to the tip 2 of the stylus 6, a positive charge is induced on the surface of the pad 6. Currents I1–I4 supply this positive charge.

Conversely, as in FIG. 4, a positive charge on the tip 2 of the stylus 6 induces a negative charge on the pad. The currents I1–I4 supply this negative charge.

The relative magnitudes of the currents depend on the position of the stylus. When the stylus is located as shown in FIG. 5, current I1 is the largest, current I4 is next largest, and currents I2 and I3 are nearly the same.

When the stylus is located as shown in FIG. 6, current I4 is the largest, current I1 is next, and so on. The differences in current magnitudes cause differences in the voltages produced by the I-to-V amplifiers of FIG. 2.

Noise

The I-to-V amplifiers produce other, unwanted, signals, in addition to those generated by the stylus. For example, nearby cathode ray tubes, fluorescent lights, and electric motors induce charge on the digitizing pad. Also, "static electricity," can be applied to the pad when touched by a user, especially when the ambient air is dry.

Because of the presence of the unwanted signals, which are called "noise," it is desirable to use a stylus which generates a signal which is as large as possible, so that the stylus signal stands out from the noise signals. That is, the signal-to-noise ratio should be maximized.

If size and power consumption posed no limitations, then attaining a large signal-to-noise ratio would be no problem. However, the stylus is designed for portability. It must be small (about the size of a pencil) and it must operate on batteries. Operating on batteries, it must consume little power, in order to extend battery life.

Obtaining a high signal-to-noise ratio from such a stylus is not a trivial problem.

OBJECTS OF THE INVENTION

An object of the invention is to provide an improved stylus for a digitizing pad.

A further object of the invention is to provide an improved stylus for a portable digitizing pad, which produces a large position signal.

BRIEF DESCRIPTION OF THE DRAWINGS

FIGS. 7A–C illustrates one approach to generating a high voltage signal.

FIGS. 8A–D illustrates one form of the invention.

FIGS. 10A–E is similar to FIG. 9, but shows three half cycles applied to the primary of the transformer.

FIGS. 12A–D illustrates parameter values for one form of the invention.

SUMMARY OF THE INVENTION

Figure 1:
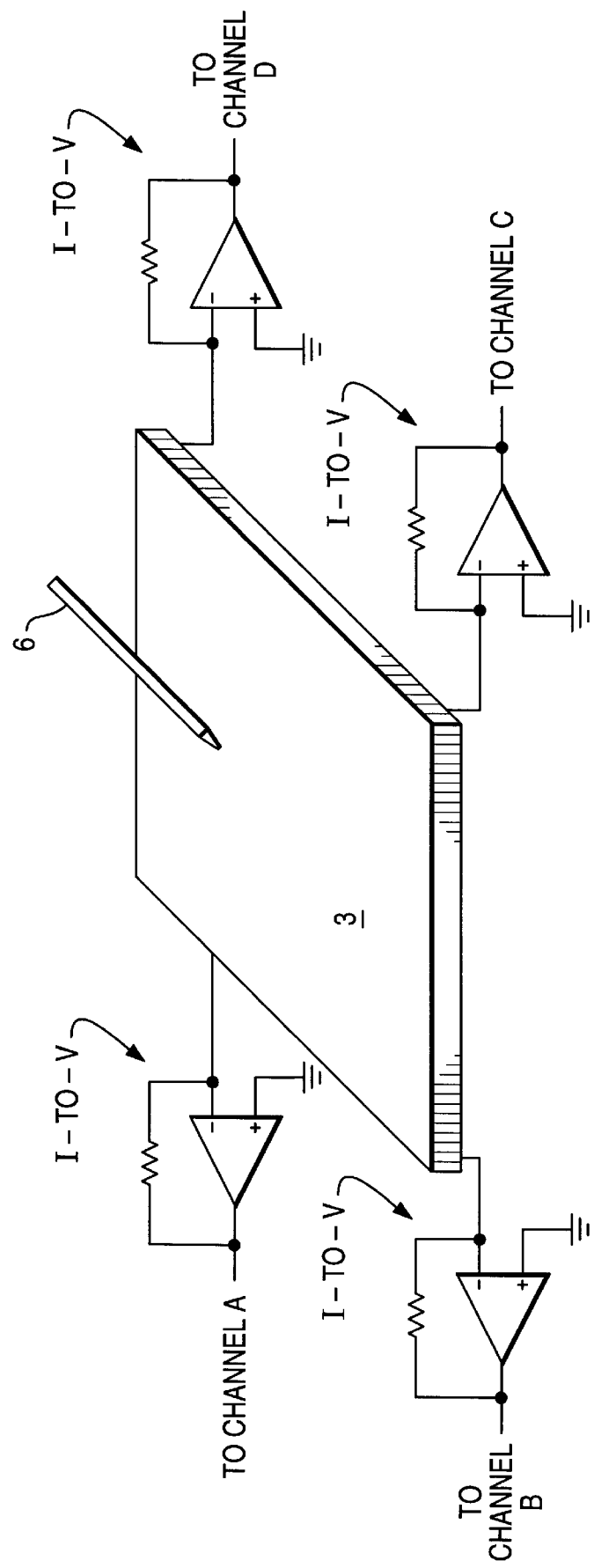
FIGS. 1 and 2 are simplified representations of prior-art digitizing pads.
Figure 2:
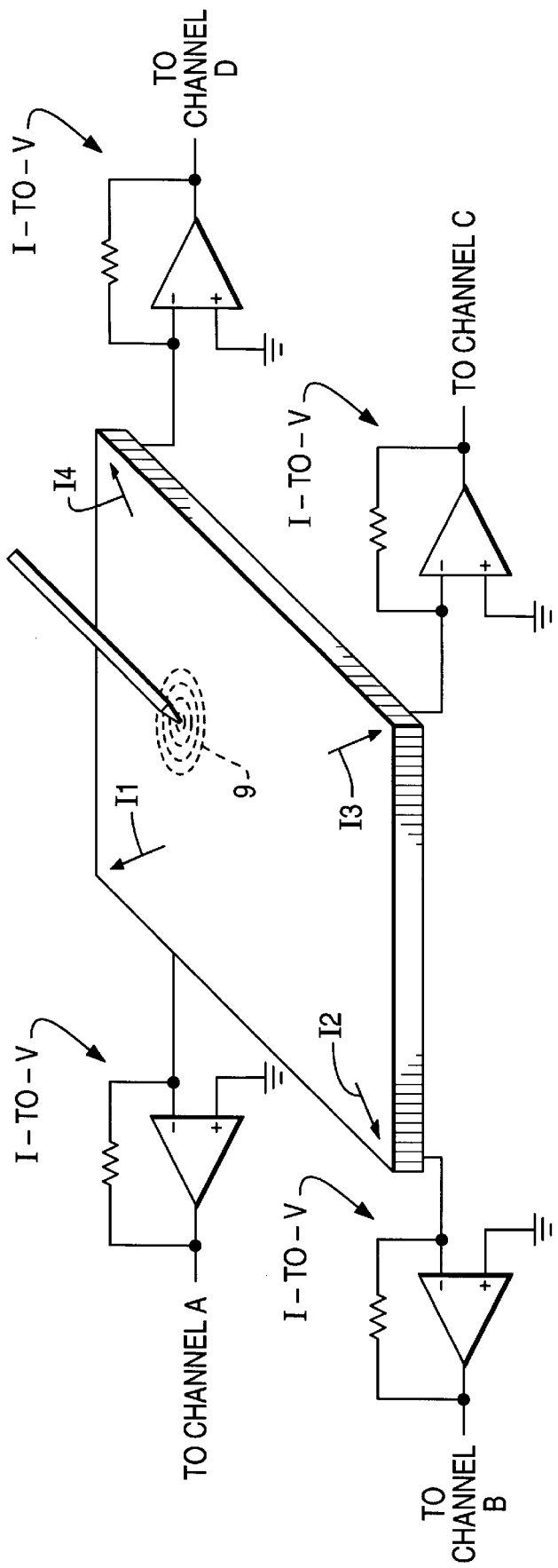
Figure 3:
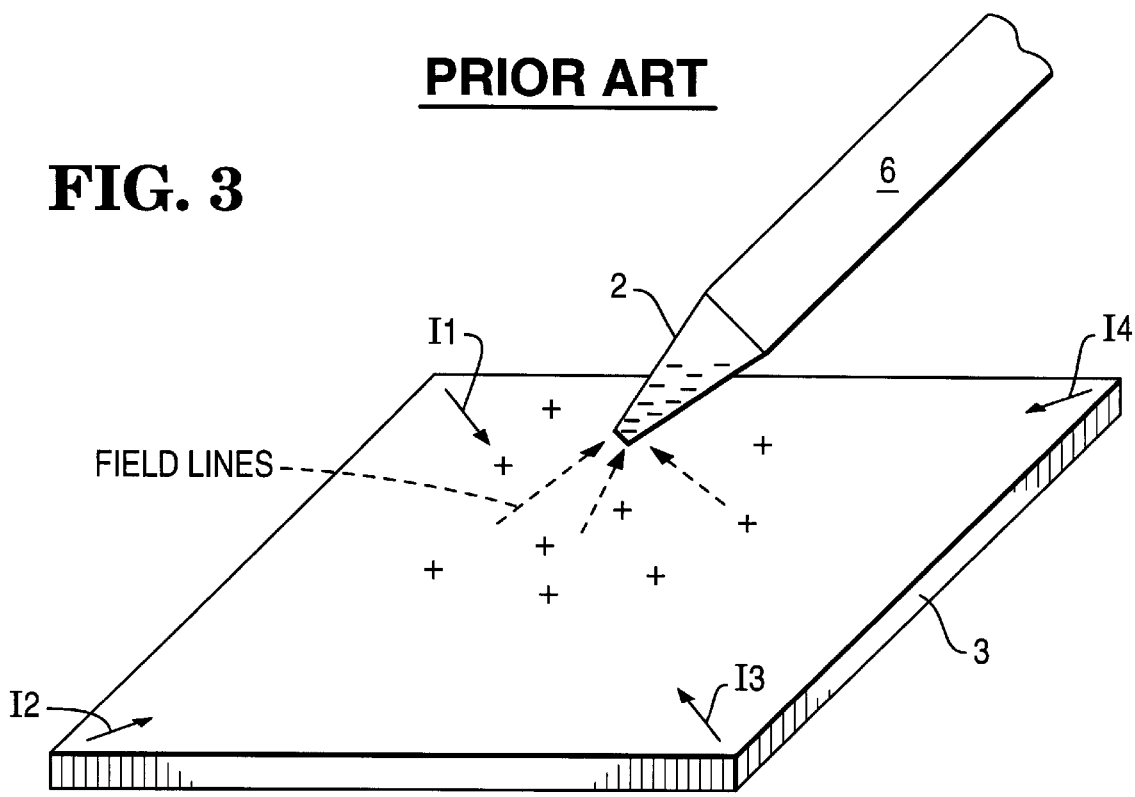
FIGS. 3 and 4 illustrate how an electrostatic stylus 6 induces a charge on a digitizing pad.
Figure 4:
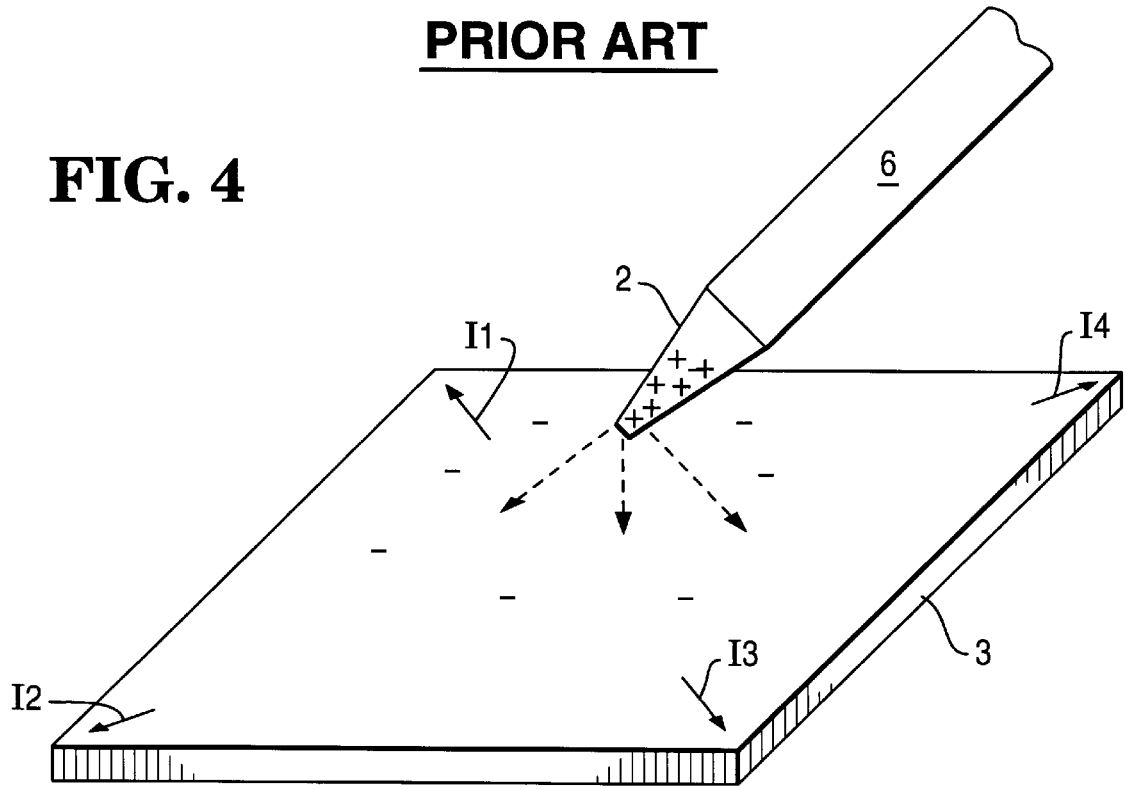
Figure 5:
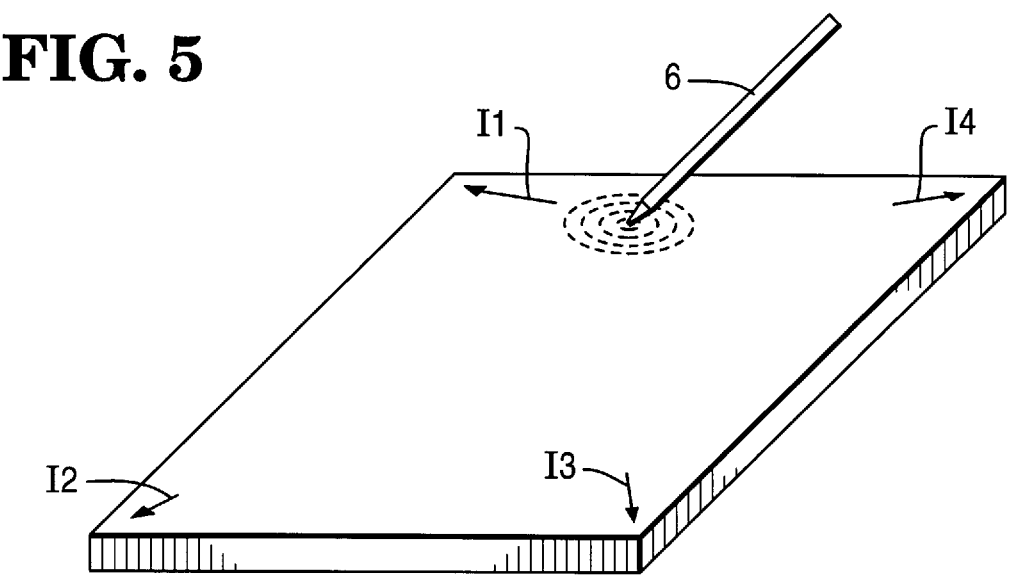
FIGS. 5 and 6 illustrate how the currents I1–I4 change, depending upon position of the stylus 6.
Figure 6:
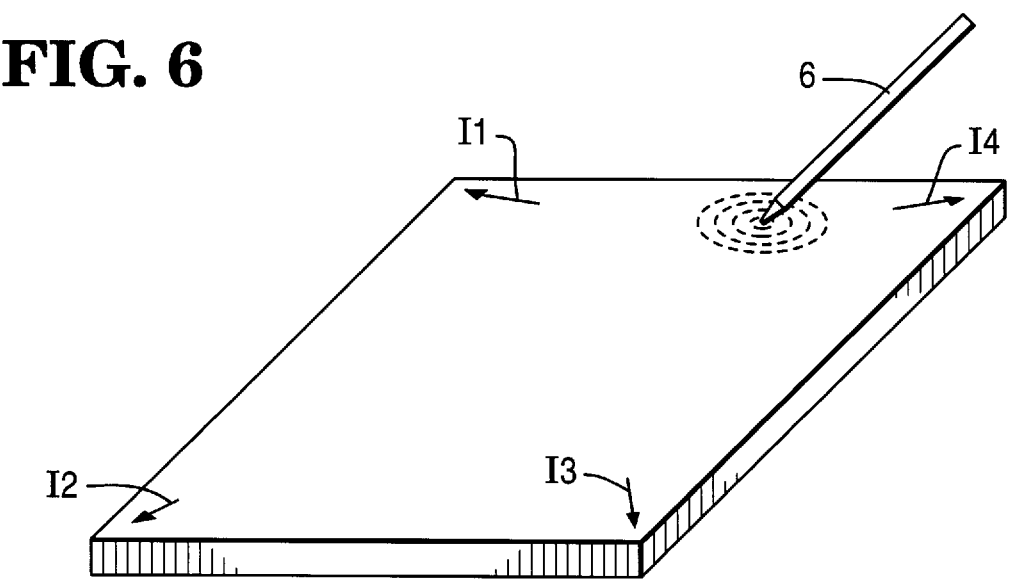

In one form of the invention, the voltage difference between a sine wave and its inverse are applied across the primary of a transformer. The secondary of the transformer drives the tip of a stylus, which cooperates with a digitizing pad.

DETAILED DESCRIPTION OF THE INVENTION

The invention will be explained by first illustrating a simple, but non-optimal, approach to producing a large stylus signal. This approach involves the use of a voltage transformer 14, as shown in FIG. 7A. (The voltages discussed herein are somewhat arbitrary, and chosen for ease of explanation. Actual voltages and currents used by the invention are discussed in the section entitled "General Considerations.")

A sine wave 12 is amplified by an amplifier A having a gain K. The amplifier output signal is assumed to be 5.0 volts peak-to-peak, as indicated in FIG. 7B. This output signal is applied to the primary 13 of a transformer 14 having a turns ratio of two. The voltage appearing at the secondary of the transformer is 10 volts peak-to-peak, as indicated in FIG. 7A.

The invention also uses a transformer, having the same turns ratio as that of FIG. 7A, but in the manner shown in FIG. 8A. Two amplifiers A1 and A2 feed the primary winding 15 of the transformer 18. The first amplifier A1 receives a sine wave 19 directly from a sine-wave generator 21. The second amplifier A2 receives a sine wave also supplied by the sine wave generator, but inverted (or, equivalently, shifted in phase by 180 degrees) by inverter I.

The output of each amplifier, which is a sine wave, is 5.0 volts, peak-to-peak, as indicated in FIGS. 8B and 8C. The voltage appearing at the secondary of the transformer is about 20 volts, peak-to-peak, as indicated in FIG. 8D. This voltage is double that produced by the system of FIG. 7A. The attainment of doubled output voltage can be explained by FIGS. 9A–E.

One-half of a sine cycle will be considered. This half cycle, labeled H1 in FIG. 9C, and produced by amplifier A1 in FIG. 8A, is applied to lead L1 of the primary shown in FIG. 9A. Another half cycle, but inverted and labeled H2 in FIG. 9D, and produced by amplifier A2 of FIG. 8A, is applied to lead L2 of the primary shown in FIG. 9A.

The resultant signal applied to leads L1 and L2 is the difference D1 (FIG. 9E) between H1 and H2. In difference signal D1, the dashed arrows are taken from H2, and represent the contribution of H2 to the net voltage; the solid arrows are taken from H1 and represent the contribution of H1 to the net voltage.

Figure 9B:
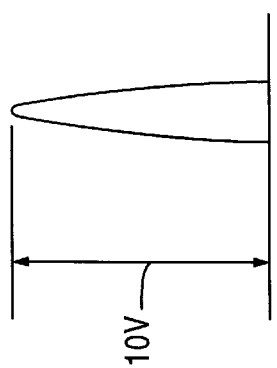
FIGS. 9A–E illustrates how the apparatus of FIG. 8 generates a high voltage signal at the primary winding 15 of a transformer.
Figure 9A:
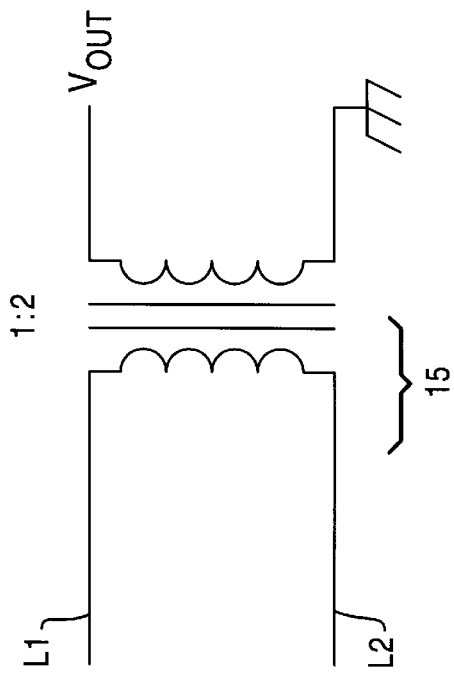
Figure 9C:
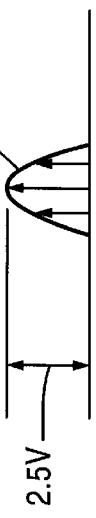
Figure 9D:
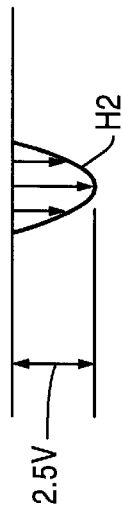
Figure 9E:
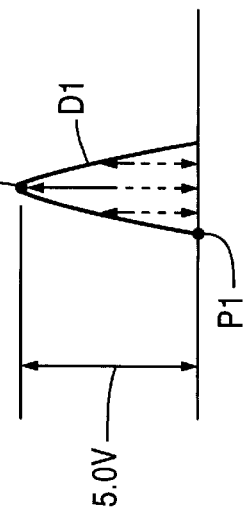

The voltage swing of D1 from zero to positive peak is five volts, as indicated by the swing from point P1 to P2 in FIG. 9E. This swing of five volts is double that of the corresponding swing for the system of FIG. 7A, which is indicated by the swing from point P3 to P4 of FIG. 7B.

The resultant voltages of two additional half-cycles are shown in FIGS. 10C–E, is and can be analyzed in exactly the same way as the single half-cycle of FIGS. 9C–E. The voltage applied to the primary of the transformer in FIG. 10A swings from zero to positive 5.0 volts (ie, from P1 to P2 of FIG. 10E), and from zero to negative 5.0 volts (ie, from P5 to P6 of FIG. 10E).

In contrast, the corresponding swing in FIG. 7B is from zero to positive 2.5 volts (ie, P3 to P4), and from zero to negative 2.5 volts (ie, from P7 to P8), or one-half the swing in FIG. 10E.

Figure 11A:
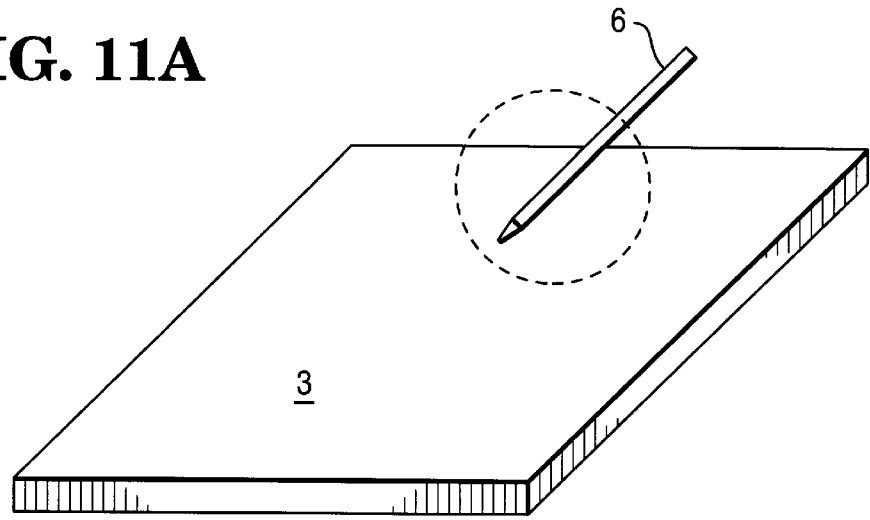
FIGS. 11A–B illustrates a schematic of one form of the invention.
Figure 11B:
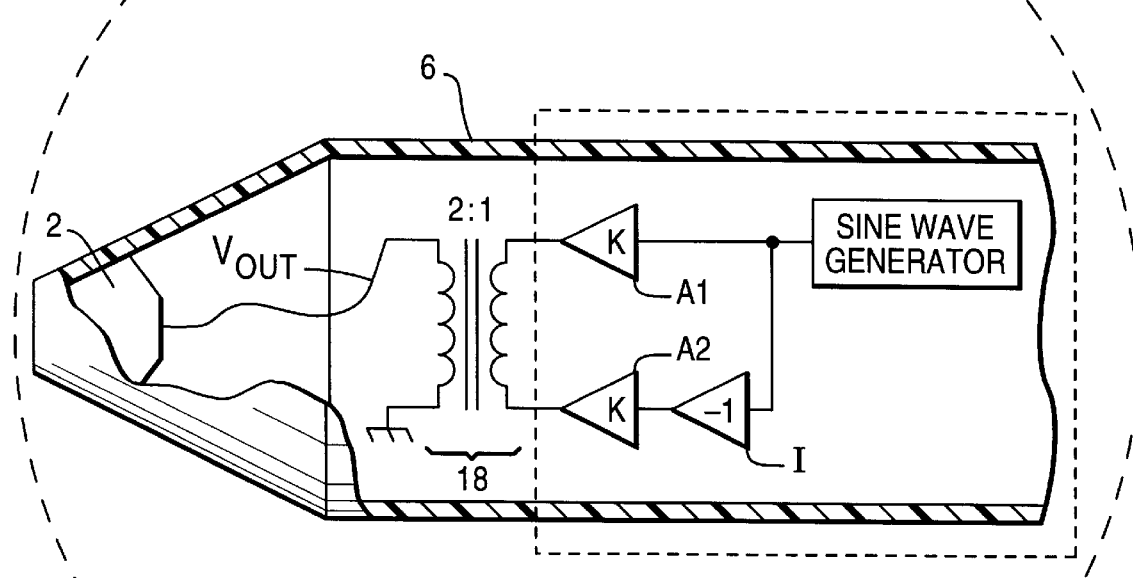

The output of the transformer 18 in FIG. 8A is applied to the tip 2 of the stylus, as shown in FIG. 11B. The tip 2 of the stylus represents a capacitive load of about 25 picoFarads. However, most of this 25-picoFarad capacitance consists of parasitic capacitances within the pen itself. The actual capacitance represented by the tip 2/pad 3 combination is in the range of 1 picoFarad.

Important Considerations

1. As shown in FIG. 12A, the actual transformer 18 has a turns ratio of ten. The sinusoidal outputs of the amplifiers A1 and A2 swing from zero to the power supply voltage, which ranges from about 3.0 to about 5.0 volts, depending on device construction. Assuming a power supply voltage of 3.0 volts, the zero-to-positive-peak swing applied to the primary is 3.0 volts (ie, the difference between half cycles H5 and H6 shown in FIGS. 12B and 12C). The output of the transformer is 60 volts, zero-to-peak, or 120 volts, peak-to-peak, as shown in FIG. 12D.

It may be thought that this high voltage (120 volts, in the case of FIG. 12D) can be obtained by using the apparatus of FIG. 7, but by doubling the turns ratio of the transformer. However, this doubling is not feasible.

Figure 13:
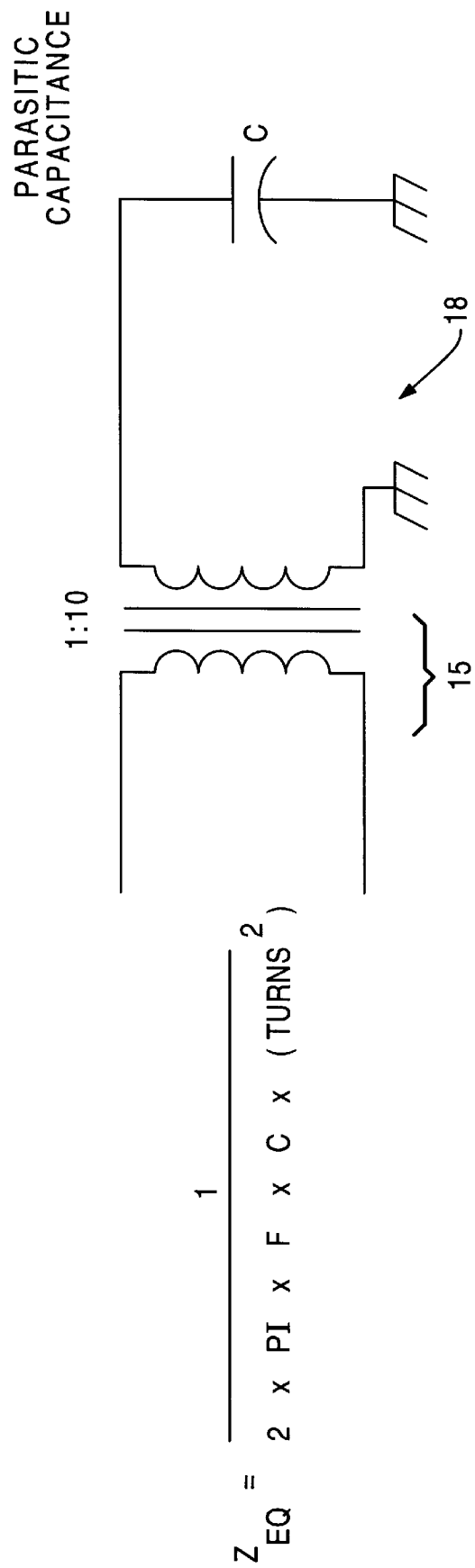
FIG. 13 illustrates how parasitic capacitance loads the primary of a transformer.

The parasitic capacitances, discussed above, require the transformer, in effect, to drive a capacitive load. Because of the capacitive load, a doubling in turns ratio causes the current drawn by the primary of the transformer to become disproportionately high: it quadruples, instead of doubling. This quadrupling occurs because the equivalent impedance, Zeq, which the capacitive load presents to the primary side of the transformer equals $$1/[j \times 2 \times PI \times f \times C \times (T\text{-squared})]$$

wherein j is the imaginary operator, f is frequency in Hertz, C is the value of the parasitic capacitance, and T is the turns ratio. FIG. 13 illustrates the situation.

Two examples, one corresponding to a doubled turns ratio, and the next corresponding to the invention's turns ratio, will illustrate the quadrupling of current.

EXAMPLE 1

High Turns Ratio

As a simple example, assume the following parameters:

C=25 pF;

frequency=250 kHz, thus making w equal 2×PI×250 kHz, or 1,570,000 radians/sec; and

T=10.

The equivalent impedance (ignoring transformer inductance), Zeq, of the capacitive load appearing at the primary winding is $$Zeq=1/[2 \times PI \times 250 \text{ kHz} \times 25 \text{ pF} \times (10 \text{ squared})]=250 \text{ ohms}$$

If the voltage V applied to the primary is 2.5 volts, peak-to-peak, then the current drawn is 2.5/250, or 10 mA. This value illustrates the current drawn under a doubling of the turns ratio.

EXAMPLE 2

Low Turns Ratio, as in Invention

If the turns ratio is cut in half, to five, the computation is exactly the same as in Example 1, except that the "T-term" becomes 5 squared, or 25, instead of 10 squared, or 100. That is, $$Zeq=1/[2 \times PI \times 250 \text{ kHz} \times 25 \text{ pF} \times (5 \text{ squared})]=1,000 \text{ ohms}$$

For a 2.5 volt peak-to-peak signal, V, applied to the primary, the current drawn is V/Zeq, or 2.5/1,000, which equals 2.5 mA. The current is ¼ that of the doubled case, because doubling the turns reduces the equivalent impedance to one-fourth the value of the non-doubled case (ie, to 250 ohms from 1,000).

Therefore, attaining a high output voltage by doubling the turns ratio of the transformer, when driving a capacitive load, causes the current drawn by the primary of the transformer to increase by a factor of four.

This fourfold increase in current is not desired. The invention avoids this increase, by avoiding the need to double the turns ratio.

2. There is an additional reason for avoiding doubling of the turns ratio of the transformer. Doubling the turns ratio requires either (a) reducing the number of primary turns, or (b) increasing the number of secondary turns (or a combination of both).

Reducing the number of primary turns is not feasible, for the following reason. The primary winding of the transformer can be viewed as an inductor, without a series resistor. In Applicants' preferred embodiment, the inductor value is 0.001 Henry. At Applicants' preferred frequency of 125 KHz, the inductor's impedance is j×(inductance value) ×(radian frequency), or j×(0.001)×(125 E 3×2×PI), which equals j 785.5 ohms.

The magnitude of this impedance is 785.5 ohms (imaginary).

If the number of primary windings is cut in half, then the inductance will be cut by a factor of four (approximately), to j 785.5/4, or j 196 ohms. (The reason is that inductance is approximately proportional to turns squared.) The new magnitude is 196 ohms (imaginary).

The new magnitude is 25 percent of the old magnitude; the magnitude has been reduced by 75 percent.

This reduction in impedance causes an increase in current drawn by the primary winding. This increased current causes the power dissipated by the amplifier which drives the primary winding to increase. Neither the increase in current, nor the increase in power consumption, is desired.

It may be thought that doubling the number of turns in the secondary winding is a feasible alternative, but it is not. Doubling the secondary turns will increase the volume of wire required, which is contrary to the goal of small size in the stylus.

Further, doubling the number of turns increases the capacitance of the secondary winding, because the adjacent wires, separated by insulation, act as capacitors. This increased capacitance, in effect, acts as an increase in the capacitive load shown in FIG. 13. It is not desirable to increase this capacitance, because the increase causes the primary winding of the transformer to draw more current, as the Examples, given above, illustrate.

3. The apparatus enclosed within the dashed box in FIG. 11B takes the form of a single integrated circuit (IC). (The actual IC contains additional circuitry, which performs additional functions, such as (a) power supply monitoring, (b) IC power management, and (c) transmission of the status of the stylus battery and condition of stylus switch states, via telemetry to the computer, or digitizing pad.) Important operating characteristics of the IC are the following.

In one embodiment, the IC receives power from three commercially available batteries, supplying 1.25 volts each, for a total of 3.75 volts. The IC draws about 3 milliamps of current, and no more than 4 milliamps, from the batteries. (This current supplies both the apparatus shown in FIG. 11B, and the additional circuitry.) Thus, power consumption is no more than 0.004 amp×3.75 volt, or no more than 15 milliwatt.

The IC contains amplifiers A1 and A2, which produce sinusoidal signals which swing, peak-to-peak, from zero to the supply voltage (3.75 volts in the present example). However, the resultant voltage applied to the primary is double each individual sinusoid: it is 2×3.75, or 7.5 volts. Restated, the swing in voltage applied to the primary is double the power supply voltage.

Known, commercial vendors are available which can manufacture ICs which produce the apparatus shown in FIG. 11B, and which operate as just described.

4. FIGS. 12A–D indicates (a) a turns ratio of ten, (b) primary voltage of 12 volts, peak-to-peak, and (c) an output voltage of 120 volts, peak-to-peak.

Other embodiments can be designed to produce a different output voltage, by any combination of the following adjustments:

(1) Changing the power supply voltage, by changing the battery type or number. This changes the rail-to-rail swing of the amplifiers A1 and A2, thereby changing the peak-to-peak voltage applied to the transformer primary.

(2) Changing the transformer turns ratio.

(3) Changing the gain of the amplifiers.

Output voltages at the secondary of the transformer such as 20, 30, 40, 50, 60, and 70 volts, or higher, can be attained. A high output voltage improves the signal-to-noise characteristics of the overall system.

5. The power supply takes the form of three commercially available batteries, producing a total of 3.1 to 4.2 volts. The average of this range of voltages is 3.6 volts, and will be called "a nominal 3.6 volts."

6. Digitizing pads which cooperate with the electrostatic pen described herein are commercially available. One vendor of such pads is Scriptel Corporation, Columbus, Ohio.

7. The sine wave 22 in FIG. 8A, and its inverse 23 in FIG. 8C, are 180 degrees out of phase. It is not strictly necessary that the phase difference equal 180 degrees, although the voltage applied to the primary is maximum when the phase angle is 180 degrees.

The sine wave 21 and its inverse 23 need not be equal in amplitude.

8. An important feature of the invention is the generation of a sinusoidal waveform having a zero-to-peak swing equal to the power supply voltage, as shown in FIG. 9B. That is, the gain of the amplifier A1 in FIG. 8A is chosen so that the positive swing indicated by half cycle H1 in FIG. 9C, from point P1 to point P2 in FIG. 9E, equals the power supply voltage. Similarly, the negative swing, indicated by half cycle H2 in FIG. 9D, also equals the power supply voltage (but of opposite polarity).

These two combined half-cycles produce an overall primary voltage swing which is, when measured peak-to-peak, double the supply voltage.

It is possible to use a smaller voltage swing applied to the primary, such as a peak-to-peak swing of 110 percent of the supply voltage.

7. The term "amplitude" refers to the zero-to-peak voltage, namely, P1 to P2 in FIG. 9E. The peak-to-peak voltage is, of course, twice the amplitude.

Numerous substitutions and modifications can be undertaken without departing from the true spirit and scope of the invention. What is desired to be secured by Letters Patent is the Invention as defined in the following claims.

We claim:

1. In a stylus for a digitizing pad, powered by at least one battery providing a voltage V, the improvement comprising:
   a transformer having a primary winding; and
   means for applying a time-varying signal, of peak-to-peak amplitude exceeding the voltage V, to said primary winding.

2. The stylus of claim 1, in combination with the digitizing pad.

3. In a battery-powered stylus for a digitizing pad, the improvement comprising:
   a) a transformer having a primary winding;
   b) means for applying two sine waves, which are out of phase, to the leads of the primary winding.

4. A stylus according to claim 3 in which the sine waves are out-of-phase by 180 degrees.

5. The stylus of claim 3, in combination with the digitizing pad.

6. In a stylus which cooperates with a digitizing pad, the improvement comprising:
   a power supply providing a voltage V; and
   means for generating a signal having a peak-to-peak voltage greater than 1.5×V; and
   means for coupling the signal to a transformer.

7. The stylus of claim 6, in combination with the digitizing pad.

8. A stylus which cooperates with a digitizing pad, comprising:
   a) a sine wave generator, which produces a sinusoidal signal S;
   b) means for amplifying the sinusoidal signal, to produce a signal S1 having an amplitude of about 3 volts peak-to-peak;
   c) means for inverting the sinusoidal signal, and amplifying the inverted sinusoidal signal, to produce a signal S2 having an amplitude of about 3 volts peak-to-peak;
   d) a transformer having a pair of primary leads and a pair of secondary leads, and having a turns ratio of about 10 between secondary and primary;

e) means for applying the difference between S1 and S2 across said pair of primary leads, to thereby induce a signal of about 60 volts peak-to-peak across said secondary leads; and f) a conductive object, connected to at least one of said secondary leads.

9. A method for operating a stylus powered by at least one battery, the at least one battery having a nominal output voltage, comprising the step of producing a signal by the stylus, said signal having a peak-to-peak voltage at least 4 times greater than the nominal output voltage of the at least one battery, while drawing no more than 5 milliamps of current from the at least one battery, wherein the step of producing a signal comprises producing a first signal having a peak-to-peak voltage greater than 1.5 times the nominal output voltage, and coupling the first signal to a transformer.

10. The method claim 9, further comprising the step of coupling the signal to a digitizing tablet.

* * * * *